United States Patent
Bertani

(10) Patent No.: US 9,352,452 B2
(45) Date of Patent: May 31, 2016

(54) PANEL SUPPORT CLAMP

(75) Inventor: Alberto Bertani, Monza (IT)

(73) Assignee: ELESA S.P.A., Milan (IT)

( * ) Notice: Subject to any disclaimer, the term of this patent is extended or adjusted under 35 U.S.C. 154(b) by 833 days.

(21) Appl. No.: 13/805,617

(22) PCT Filed: Jun. 24, 2011

(86) PCT No.: PCT/IB2011/052796
§ 371 (c)(1),
(2), (4) Date: Dec. 19, 2012

(87) PCT Pub. No.: WO2011/161659
PCT Pub. Date: Dec. 29, 2011

(65) Prior Publication Data
US 2013/0086776 A1 Apr. 11, 2013

(30) Foreign Application Priority Data
Jun. 25, 2010 (IT) .............................. MI20100218 U

(51) Int. Cl.
*B25B 5/10* (2006.01)
*B25B 5/02* (2006.01)
*F16B 2/12* (2006.01)

(52) U.S. Cl.
CPC ... *B25B 5/02* (2013.01); *F16B 2/12* (2013.01); *Y10T 24/44051* (2015.01)

(58) Field of Classification Search
CPC .......... B25B 27/08; B25B 27/20; B25B 7/02; B25B 27/06
See application file for complete search history.

(56) References Cited

U.S. PATENT DOCUMENTS

| 3,845,538 A * | 11/1974 | Demler, Sr. | B25B 27/16 29/234 |
| 6,032,939 A | 3/2000 | Chen | |
| 2011/0089621 A1* | 4/2011 | Seidel | B25B 5/003 269/46 |
| 2013/0086776 A1* | 4/2013 | Bertani | F16B 2/12 24/461 |
| 2013/0181469 A1* | 7/2013 | Williams | B25J 15/026 294/207 |
| 2015/0054210 A1* | 2/2015 | Schweigert | B25B 1/103 269/218 |

FOREIGN PATENT DOCUMENTS

WO 2004/051095 A1 6/2004

OTHER PUBLICATIONS

International Search Report and Written Opinion issued Nov. 7, 2011 in PCT patent application No. PCT/IB2011/052796.

\* cited by examiner

*Primary Examiner* — Lee D Wilson
(74) *Attorney, Agent, or Firm* — Pearne & Gordon LLP

(57) ABSTRACT

A panel support clamp consisting of: at least a pair of mutually cooperating jaws (1,2) and both carrying, on one side, fastening and tightening elements; said fastening and tightening elements providing, on a first one of said jaws, a parallelepiped body (6) with at least one screw-in seat and, on a second one of said jaws, a tightening screw, as well as guiding elements for the housing of said parallelepiped body, consisting of a pair of retaining arms (9a, 9b) and of a cavity obtained on the inner surface thereof; on each of the lateral walls of said parallelepiped body a guiding groove (13), for the housing and sliding of a pair of articulating pins (14a, 14b), protruding inwards from the ends of said retaining arms; within said parallelepiped body recesses (7) for the introduction of fastening elements to a support base, and control means maintaining secure the parallelism between the opposite surfaces of the two jaws (1,2) and the respective panel walls.

19 Claims, 6 Drawing Sheets

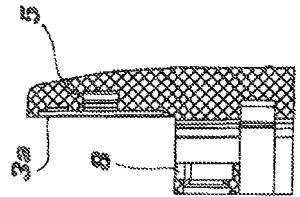
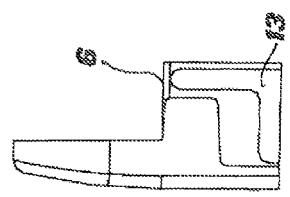
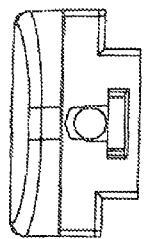
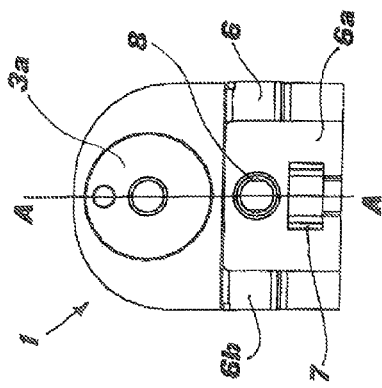
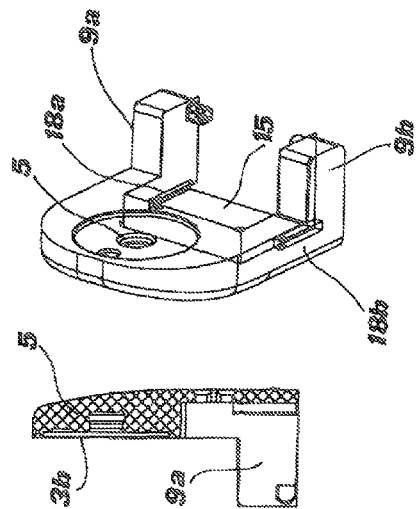
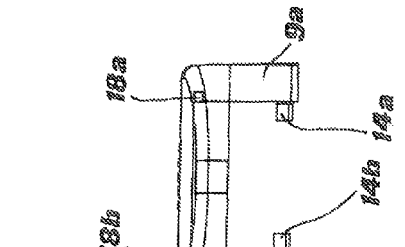
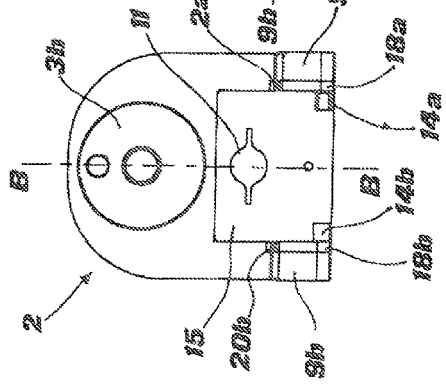

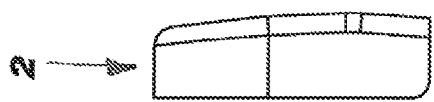
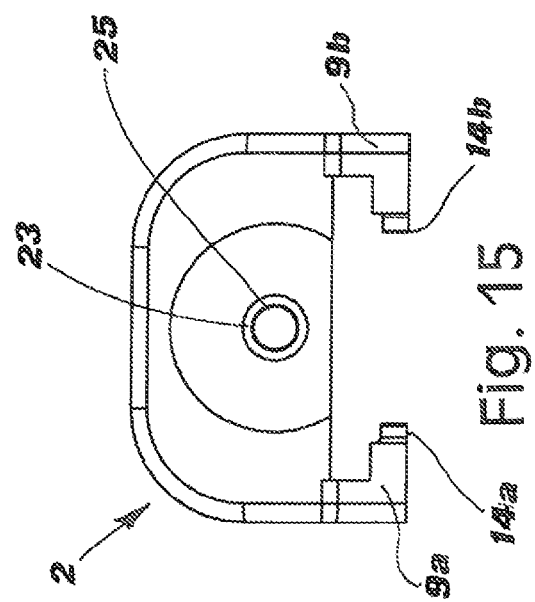

PANEL SUPPORT CLAMP

The present invention relates to a clamp for the support of panels, of the type providing two mutually engaged jaws which keep a panel in a fixed and stable position.

It is known in the art to use clamps for supporting panels, said clamps substantially consisting of a pair of mutually cooperating jaws, having elements of mutual fastening and tightening and elements of engagement and locking of the panel wall.

The Machinery Directive 2006/42/EC has recently issued also the features that the machines, the machine components and the interchangeable equipment have to be launched on the market, postulating the need for the individual elements subject to mounting, disassembling and maintenance to be "lossproof/unlosable"; as a result, it was necessary to find solutions to enable operators to proceed to the mounting/disassembling and safety arrangement of the panel clamps so that no clamp component may become detached from the main body of the clamp.

A two-jaw panel clamp, the individual elements of which contribute to obtain a complex having features apt to guarantee, at least in part, unlosability, meets the above mentioned provision. In particular, one of the two jaws has—on the surface of engagement with the panel—a central parallelepiped body projecting inwards, at the sides of which two identical, parallelepiped shoulders are provided of such a size as to allow a thick "L" to be recognised on the lateral surfaces of the central body. On each L-shaped surface of said central parallelepiped body of the first jaw there is provided a guide groove which substantially follows the margin profile thereof. On the central parallelepiped body a seat for housing tightening screws of the jaw to an external support member has furthermore been obtained and—perpendicularly to said seat—a threaded hole for the insertion of a tightening screw housed in the other jaw.

The second jaw provides in turn a pair of retaining arms, which project from the base of the engagement surface thereof, which are at such a mutual distance as to allow the insertion between themselves of the parallelepiped body of the first jaw, and at such a height as to be able to be tightly engaged below the lateral shoulders of the first jaw.

On the lower end of each arm an articulating pin is provided projecting inwardly, apt to tightly engage within a corresponding guiding groove of the first jaw, so as to guarantee a secure fastening between the jaws.

On each jaw there is applied a plate made of soft material which deforms upon tightening to guarantee the perfect fastening of the inserted panel.

Such a device is evidently advantageous with respect to the prior art, and solves some of the problems to comply with the Machinery Directive. However, it has been noticed that the above clamp still has some disadvantages.

In particular, it has been detected that upon tightening, since the panel may vary in thickness, the compression factor of the deformable elements is not always certain. This is due to the fact that the screw does not always find a certain abutment at fastening completion with the varying of the panel thicknesses (i.e. the two jaws do not close pack-like). More precisely, such uncertainty makes it very likely that the jaws—at tightening end—are not perfectly parallel, but tend to arrange themselves obliquely and deform, with evident problems related to the grip on the panel and to load on the clamp. Understandably, in the long run this problem may cause wear on the points of greatest stress and local deformations on the structures in correspondence of highest load.

Moreover, in the clamp now described, full unlosability has not been fully achieved yet: as a matter of fact, the mutual tightening screw between the two jaws is not locked in any way, and as a result it may loosen and fall; moreover, the structure of the panel engagement and locking elements is not able to guarantee that the latter can remain in a secure and fixed position without risks of detaching during the operation of adjustment.

The object of the invention is therefore to propose a clamp for panels which has devices apt to guarantee the perfect engagement between all the interaction surfaces of the two jaws, ensuring secure gripping, and to provide the certainty of full unlosability.

Said object is achieved through a panel support clamp of the type consisting of:
  at least a pair of mutually cooperating jaws and carrying both, on one side, fastening and tightening elements;
  said fastening and tightening elements providing, on a first one of said jaws, a parallelepiped body with at least one screw-in seat and, on the second one of said jaws, a tightening screw, as well as elements for guiding and housing said parallelepiped body, consisting of a pair of retaining arms and of a cavity obtained on the inner surface thereof;
  on each of the lateral walls of said parallelepiped body of the first jaw a guiding groove being furthermore provided, for the housing and sliding of a pair of articulating pins, projecting inwardly from the ends of said retaining arms of said second arm;
  within said parallelepiped body of the first jaw recesses being provided for the insertion of fastening elements to a supporting base,
characterised in that
  control means are provided apt to maintain the parallelism between the opposite surfaces of the two jaws and the respective walls of the panel during the displacement of said second jaw and the tightening thereof to said first jaw.

Some particularly preferred features which improve the set objects are defined in the dependent claims.

Further features and advantages of the invention are in any case more evident from the following detailed description of two preferred embodiments, given purely as a non-limiting example and illustrated in the attached drawings, wherein:

FIG. 1 is a front view of the internal surface of a first jaw according to a first embodiment;

FIG. 2 is a top view of the jaw of FIG. 1;

FIG. 3 is a side view of the jaw of FIG. 1;

FIG. 4 is a section along line A-A of the jaw of FIG. 1;

FIG. 5 is a front view of the internal surface of a second jaw;

FIG. 6 is top view, with parts in transparent sight of the jaw of FIG. 5;

FIG. 7 is a section along the line B-B of the jaw of FIG. 5;

FIG. 8 is a perspective view of the jaw of FIG. 5;

FIG. 12 is a front view of the internal surface of jaw 1 according to the second embodiment, of which FIG. 15 is a front view of the internal surface of the second jaw according to the second embodiment, of which FIG. 16 is a lateral view, and FIG. 17 is a top view;

FIG. 18 is a lateral view of a tightening screw arranged for the second embodiment, of which

FIG. 20 is the front view of the internal surface of the first jaw according to the third embodiment, of which

Figure 11:
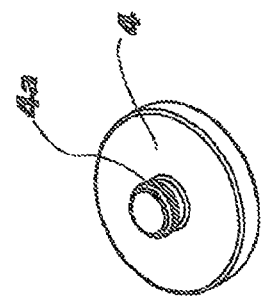
FIG. 11 is the perspective view of a plate made of deformable material of the type which is mounted on the clamp according to the invention.

The panel support clamp according to a first embodiment consists of a pair of mutually cooperating jaws 1, 2, each generically having an L-shaped profile and both carrying, on a first side, lowered seats 3a, 3b for the snap-fit housing of plates 4 engaging with the panel wall and, on a second side, elements of mutual fastening and tightening.

Seats 3a, 3b house plates 4, made of soft material, associated with the opposite surfaces of each first side of said clamp jaws 1, 2, and contain the radial extension thereof favouring the retaining thereof and increasing the tightening force of the two jaws.

According to a first preferred feature, said plates 4 are preferably kept in a secure position through the snap-fit engagement of at least one respective shaped tang 4a, projecting behind from the centre of plate 4, within an undercut cavity 5 obtained within each first side of the jaw.

The fastening and tightening elements substantially consist, on a first one of said jaws 1, 2, of a parallelepiped body 6 wherein a recess 7 for the insertion of fastening elements to a support base and a screw-in seat 8 are obtained in a mutually perpendicular asset.

On the second jaw, the fastening and tightening elements consist of elements for guiding and housing the parallelepiped body 6, consisting of a pair of retaining arms 9a, 9b, and of a cavity 15 obtained on the inner surface of the first side thereof.

A tightening screw 10, housed within a hole 11 provided on the first side of the second jaw, is apt to engage with the screw-in seat 8 of the first jaw, for the mutual tightening of the two jaws 1, 2.

Figure 9:
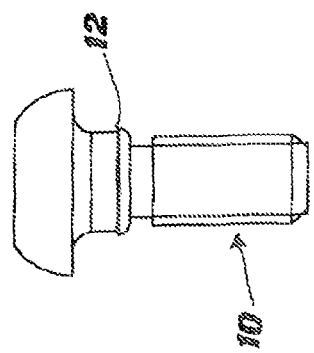
FIG. 9 is the lateral view of the tightening screw of the first embodiment.
Figure 10:
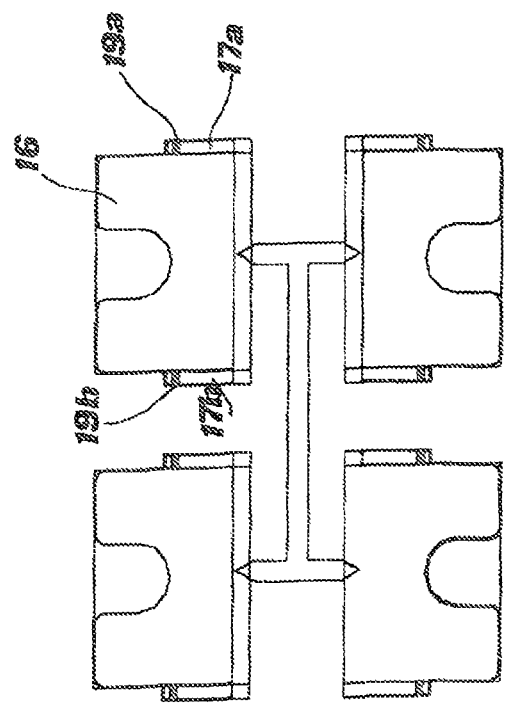
FIG. 10 is the view of a series of spacers according to the first embodiment arranged for the sale.
Figure 12:
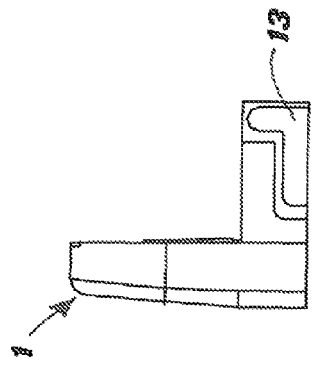
Figure 13:
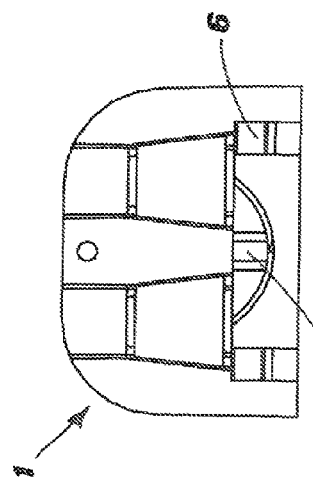
FIG. 13 is a lateral view.
Figure 14:
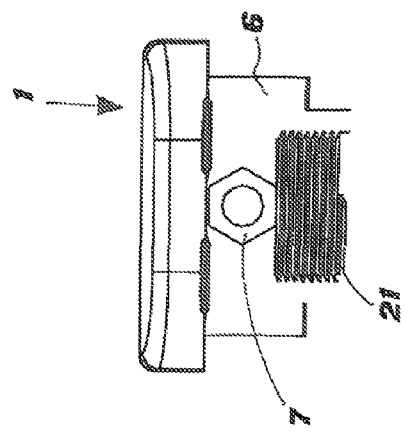
FIG. 14 is a top view
Figure 19:
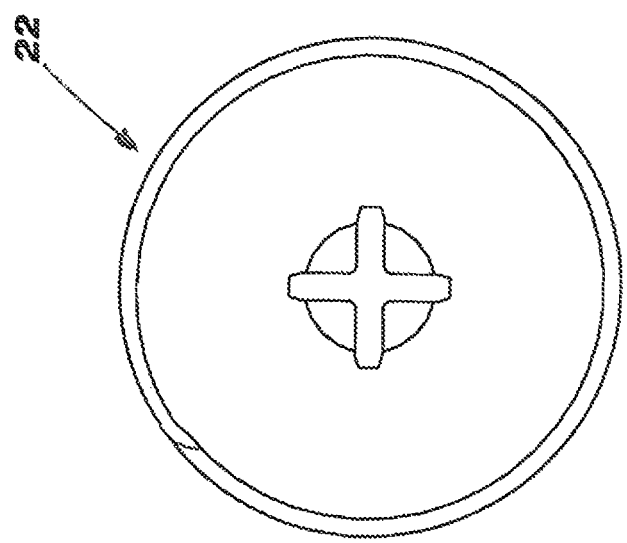
FIG. 19 is the front view of the external face.
Figure 18:
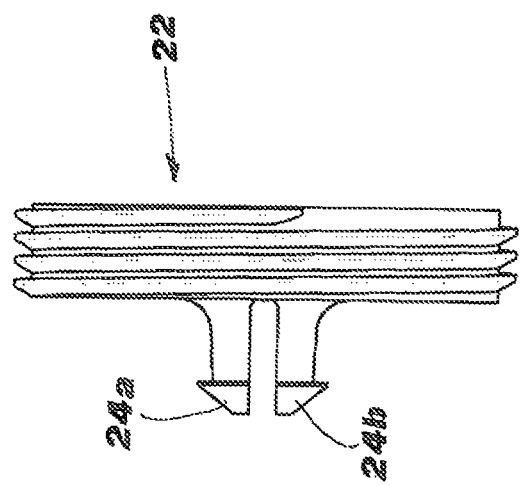

Screw 10, as shown in FIG. 9, is fully similar to a partially un-threaded, conventional, hexagonal screw, wherein, however, a flange 12 is provided between the head and the threading. Once the screw has been inserted, the flange acts as engagement element against the wall of the second jaw, so that the unlosability of the screw is guaranteed.

Preferably, in order to ease the manufacturing of the first jaw and make the holding more solid, the screw-in seat 8 on the first jaw consists, according to the first embodiment, of an inside-threading bush, embedded in said parallelepiped body 6.

Moreover, the hole 11 for housing tightening screw 10 in the second jaw has a crosswise notch, apt to allow elastic spreading apart, and consequently ease the pressure-insertion of the screw flange.

In order to make the engagement between the two jaws 1, 2 secure, the centrally arranged parallelepiped body 6 is flanked laterally by two smaller shoulders 6a, 6b, which guarantee the perfect housing of arms 9a, 9b and the engagement between parallelepiped body 6 and the internal surface of the second jaw.

Moreover, along the edges of each one of the lateral walls of said parallelepiped body 6 of the first jaw there are provided guiding grooves 13 with each one of which an articulating pin 14a, 14b engages, protruding inwards from the ends of said retaining arms 9a, 9b of the second jaw.

Preferably, and according to another aspect of the invention, for the engagement between the two jaws 1, 2 to be secure, engagement pins 14a, 14b have a square-base profile with a bevelled edge in a front-low position. This allows to ease the sliding of each one of pins 14a, 14b along the respective guiding groove 13 and to provide greater resistance, causing pins 14a, 14b to rest with a whole wall thereof against the support surface when the clamp system is brought into tension.

Moreover, according to a fundamental feature of the first embodiment, in order to be able to guarantee the correct engagement between the two jaws 1, 2, cavity 15—provided to act as the housing of said parallelepiped body 6 of the first jaw—is arranged so as to be able to house also at least a possible interchangeable spacer insert 16, essentially shaped as a small plate.

More precisely, each insert 16 is equipped with two ribs 17a, 17b, at least partially protruding from the opposite edges of said spacer insert 16. At the same time, in cavity 15 there are provided two rectilinear, parallel, opposite grooves 18a, 18b in correspondence of the lateral walls thereof. Such grooves 18b are intended to house said ribs 17a, 17b by snap fit engagement.

Moreover, in order to guarantee unlosability, it is provided that the ribs 17a, 17b protruding from the opposite edges of such spacer insert 16 have a bevelled groove 19a, 19b for the snap-engagement with a tooth 20a, 20b provided along said grooves 18a, 18b. Thereby, the pressure-introducing of spacer 16 into each of said rectilinear, parallel grooves 18a, 18b, in cooperation with said snap-engagement, leads to a secure engagement of spacer 16 with cavity the 15 of the jaw. As can be easily understood, this engagement may be released only by applying a certain pressure.

The selling kit of every panel clamp according to this embodiment contains a series of spacer inserts, the thicknesses of which vary, for example between 1 and 10 mm, the function of which is better described here in the following.

In the second embodiment of the clamp, some different features which change the structure and control means of the displacement and tightening are provided. In particular, the first jaw 1 is shaped so that parallelepiped body 6 has on the upper surface thereof a threaded cylindrical recess 21. In a complementary manner, on the second jaw 2 a screw-in disc 22 is pivoted so that the centre thereof lies in correspondence of the thrust centre 23 of jaw 2.

Moreover, retaining arms 9a, 9b depart from the base of jaw 2, aligned with the tightening surface thereof. The ends of said retaining arms 9a, 9b are folded at 90° and mutually opposite, and have—in correspondence of the opposite end surface—the already described pins 14a, 14b for engagement with guiding groove 13. Such a configuration, in the engagement with jaw 1, causes retaining arms 9a, 9b to be keyed on below guiding groove 13 of jaw 1, and makes the mutual engagement even more secure.

In order to guarantee the stability and unlosability of screw-in disc 22, said disc is equipped, on the extension of the axis thereof, with a pair of opposite pins 24a, 24b, intended for the engagement with an undercut cavity 25 arranged in correspondence of thrust centre 23.

It must be pointed out that so far in the description reference has been made to plates engaging with the panel wall which are kept in snap-fit engagement with the jaws: it is possible to provide instead for them to be manufactured by overprinting, or fully absent.

Figure 21:
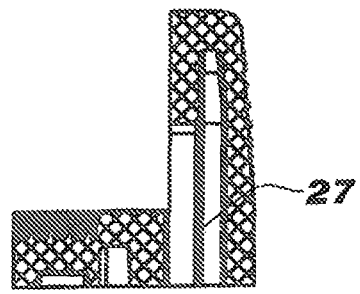
FIG. 21 is the section view of a first jaw according to a third embodiment.
Figure 20:
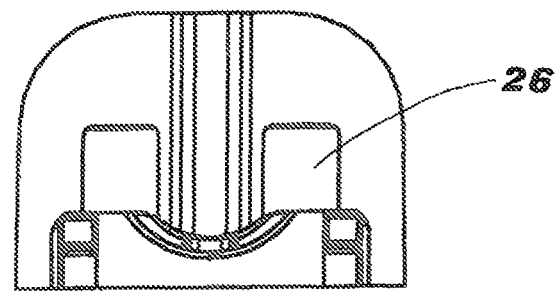
Figure 22:
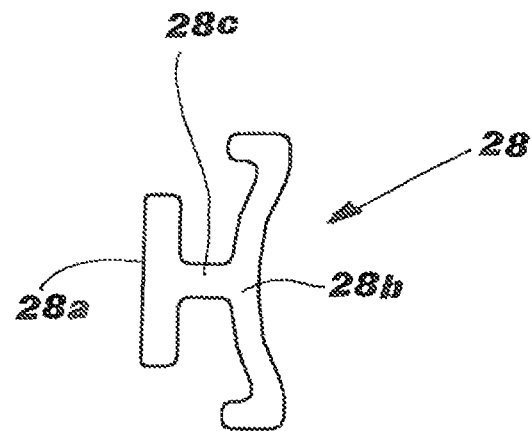
FIG. 22 is the top view of an abutment element of the third embodiment.

A third embodiment, illustrated in FIGS. 20 to 22, shows an alternative solution, wherein on said first jaw 1 windows 26 are provided on the engagement surface with the panel which are apt to house bodies engaging with the panel wall which are described in the following. In the main body of jaw 1, in correspondence of the windows and up to the base, cavities 27 are provided for the housing of said engagement bodies.

They consist of a double-T-shaped element with differentiated wings 28, the planar wing 28a being apt to contact against the panel, while wing 28b has a concave trend with respect to connection axis 28c, and at the ends it has flaps engaging with the walls of cavity 27. Such an engagement element 28 may consist of a rubber element or of a plastic spring. Said spring may have an alternative shape from the illustrated one, despite maintaining the same engagement function reported above.

The operation of the clamp appears evident from the description of the components. Only in the case of the first embodiment must the operator simply insert a possible spacer insert 16 into the cavity 15 of the second jaw; the choice of the thickness of the insert will be determined according to the thickness of the panel the operator wants to fasten, so as to ensure a perfect parallelism of the first sides of the jaws during the tightening against the panel. In all cases, the operator inserts—wherever it has not been provided yet during packing, the second jaw in engagement with the first jaw, bringing pins 14a, 14b into engagement with guiding groove 13, then bringing the second jaw into an open position, i.e. substantially in a direction perpendicular with respect to jaw 1.

In the following step, the operator will then have to lock the first jaw to a fixed support by introducing the head of a screw (not shown) into recess 7, and the tightening through a suitable service hole arranged at the top of parallelepiped body 6.

Once the first jaw has been fixed, the operator acts on the second jaw, bringing it into tightening position, and then locking the screw and bringing into mutual engagement the two jaws. In the case of the first embodiment, the tightening of screw 10 brings in contact parallelepiped body 6 and spacer 16 at the moment in which the two plates 4 engage in a secure and final way with the panel. In the case of the second embodiment, screw 22 will bring jaw 2 to slide towards jaw 1, up to the moment of engagement of the relevant surfaces, possibly equipped with plate, with the panel: the two jaws will not necessarily have to be in contact.

From the above-reported description it is evident that the set object have been achieved, manufacturing a clamp which is capable of closing pack-like the two jaws 1 and 2 on the panel, whatever the thickness of said panel, making the engagement between the surfaces of said jaws perfect and the surfaces of the panel whereon the clamp closes, and that at the same time has all the features for being compliant with the Machinery Directive, i.e. provided with all unlosable elements.

As a matter of fact, once the clamp has been mounted, the two jaws 1, 2 are kept in mutual, unlosable engagement, without the detachment being possible, at least until jaw 1 is removed from the support.

Moreover, screw 10 for the mutual tightening of the two jaws is unlosable, thanks to the engagement between retaining flange and the corresponding hole 11 suitably provided with a crosswise notch, which allows the elastic spreading apart thereof.

From the above-said description one also understands that the engagement elements with the panel walls are not strictly necessary for the accomplishment of the invention: they only have the object of increasing the protection of the panel wall and increase the abutment.

It is in any case understandable that the description of the invention reported in the two preferred embodiments may be subject to changes or variations which are in any case recomprised in the scope of protection of the invention, as defined in the attached claims.

The invention claimed is:

1. A panel support clamp comprising:
   at least one pair of mutually cooperating jaws and both carrying, on one side, fastening and tightening elements; said fastening and tightening elements providing, on a first one of said jaws, a parallelepiped body with at least one screw-in seat and, on a second one of said jaws, a tightening screw, as well as guiding elements for the housing of said parallelepiped body, including a pair of retaining arms and a cavity obtained on the inner surface thereof;
   a guiding groove provided on each of the lateral walls of said parallelepiped body of the first jaw configured to house and slide a pair of articulating pins, inwardly protruding from the ends of said retaining arms of said second jaw
   within said parallelepiped body of the first jaw there being provided recesses for the introduction of fastening elements to a support base; and
   a control to maintain the parallelism between the opposite surfaces of the two jaws and the respective walls of the panel during the displacement of said second jaw and the tightening thereof to said first jaw.

2. The clamp of claim 1), wherein the control includes at least one interchangeable spacer insert, which is housed in a secure engagement with a pair of rectilinear, parallel, opposite grooves, obtained in the proximity of the engagement surface of said cavity of the second jaw, building the housing of said parallelepiped body of the first jaw.

3. The clamp of claim 2), wherein said insert provides ribs, which protrude at least partially from the opposite edges, apt to engage with said pair of grooves.

4. The clamp of claim 3), wherein said ribs protruding from the opposite edges of said spacer insert are sized so as to be seated by snap fit engagement into each of said grooves.

5. The clamp of claim 1), wherein said ribs have a bevelled groove apt to snap-engage with an engagement tooth provided along said grooves.

6. The clamp of claim 1, wherein said screw-in seat on the first jaw includes an inwardly threaded bush, embedded in said parallelepiped body.

7. The clamp of claim 1), wherein said second jaw is provided with a hole for the introduction of said tightening screw, said screw being provided, between the head and the threading, with a retaining flange and said hole having a crosswise notch, which allows the elastic spreading apart thereof, apt to ease the pressure-introduction of said screw flange.

8. The clamp of claim 1), wherein said control includes a screw-in disc pivoted in correspondence of the thrust centre of said jaw, and brought into secure engagement with a respective threaded, cylindrical cavity on the upper surface of said parallelepiped body of the first jaw.

9. The clamp of claim 8), wherein said retaining arms, the ends of which are folded at 90° and mutually opposite, departing from the base of said jaw aligned with the tightening surface thereof, and in that on said ends there are arranged, also mutually opposite, said pins.

10. The clamp of claim 8), characterised wherein said screw-in disc pivoted on the thrust centre of said second jaw is kept in a secure and unlosable position at the jaw by the engagement of a pair of opposite pins with an undercut cavity.

11. The clamp of claim 1), wherein on the engagement side with the panel wall of said jaws there are provided lowered seats for the snap-fit housing of plates engaging with the panel wall.

12. The clamp of claim 11), wherein said seats there is further obtained an undercut cavity, and each of said plates is equipped with at least one respective shaped shank/tang projecting backwards from the centre of the plate, and apt to the snap-fit housing in said undercut cavity.

13. The clamp of claim 1), wherein said engagement plate is manufactured by overprinting.

14. The clamp of claim 1), wherein on the side of engagement with the panel wall of at least one of said jaws there are provided windows apt to house bodies engaging with the panel wall.

15. The clamp of claim 14), wherein the central body of said at least one jaw in correspondence of windows, and up to the base, there are provided cavities for the housing of said engagement bodies.

16. The clamp of claim 14), wherein said engagement bodies include a double-T element with differentiated wings, planar wing being apt to the contact against the panel, while wing has a concave trend with respect to connecting axis, and at the ends has flaps engaging with the walls of cavity.

17. The clamp of claim 14), wherein said engagement element includes a rubber element.

18. The clamp of claim 14), wherein said engagement element includes a plastic spring.

19. The clamp of claim 1, wherein said engagement pins have a square-base profile with a bevelled edge in a front-lower position.

* * * * *